United States Patent [19]

Economy

[11] 4,034,539

[45] July 12, 1977

[54] ATTACHMENT FOR SHOPPING CART

[76] Inventor: George C. Economy, 1807 Meadowdale Ave., Atlanta, Ga. 30306

[21] Appl. No.: 634,768

[22] Filed: Nov. 24, 1975

[51] Int. Cl.² .................................. G09F 21/00
[52] U.S. Cl. .......................... 40/308; 280/33.99 A; 281/45
[58] Field of Search ................... 40/308, 10 R, 320; 280/33.99 A, 33.99 B, 33.99 C, 33.99 T, 33.99 R, 33.99 S, 33.99 H, 33.99 F; 281/45, 15 B, 30

[56] References Cited

U.S. PATENT DOCUMENTS

| 2,527,216 | 10/1950 | Harris | 281/45 |
|---|---|---|---|
| 2,888,761 | 6/1959 | Miller | 280/33.99 A X |
| 3,023,018 | 2/1962 | Welter | 40/308 X |
| 3,082,557 | 3/1963 | Huff | 40/308 X |
| 3,251,543 | 5/1966 | Bush et al. | 40/308 X |
| 3,351,380 | 11/1967 | Sprague | 297/377 |
| 3,539,204 | 11/1970 | Keller | 281/45 |
| 3,881,267 | 5/1975 | Hicks | 40/308 |

FOREIGN PATENT DOCUMENTS 1,553,969  12/1968  France ................... 280/33.99 A Primary Examiner—John F. Pitrelli
Attorney, Agent, or Firm—Jones, Thomas & Askew

[57] ABSTRACT

An attachment for use on a shopping cart having a pivotally suspending rear wall panel including a collapsible infant seat portion with the attachment including an elongated substantially flat member having means for pivotally connecting the attachment member to the collapsible infant seat whereby the member is in sliding contact with an upper edge of the rear wall panel, and wherein the attachment is movable from a vertically oriented non use position located against an outside of the rear wall to an adjusted operable position when the collapsible infant seat is adjusted for use. The attachment is constructed of an integral unit of synthetic material and includes a substantially flat upper surface which can be used as a shoppers desk, with the flat upper surface including a number of outlined areas, certain of the outlined areas including advertising media and certain of the outlined areas including an itemized location of goods located in the shopping area. The attachment member is provided with means for releasably holding a shoppers list and means for maintaining a writing instrument, such as a pencil, in position during use of the shopping cart.

1 Claim, 3 Drawing Figures

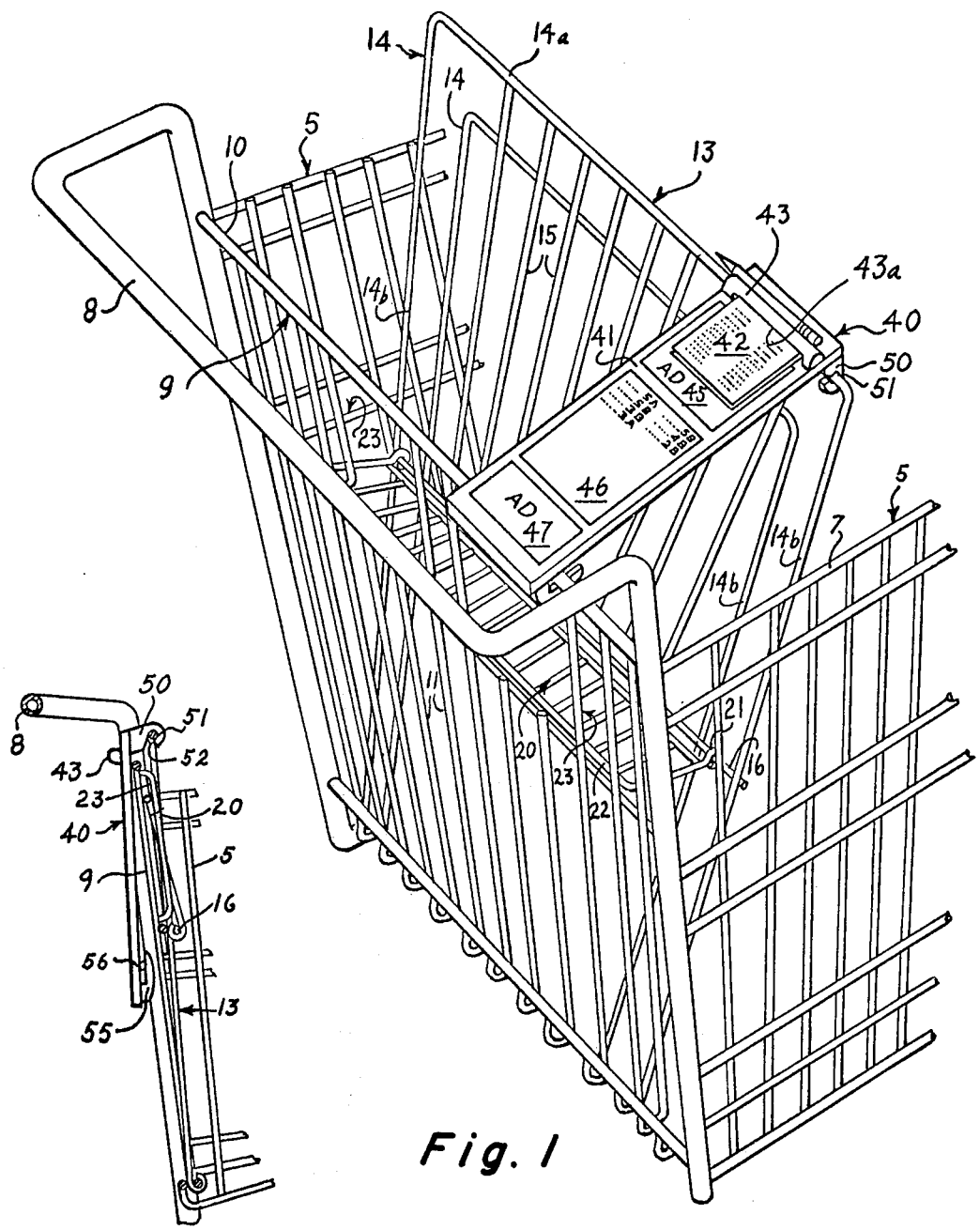
Fig. 1
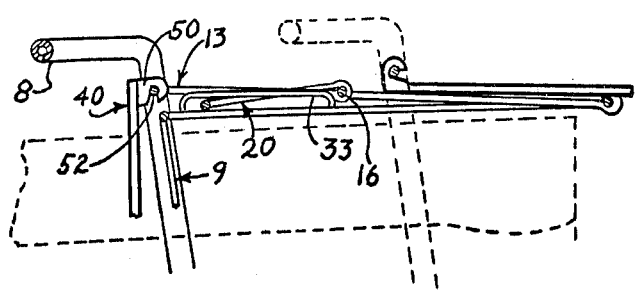
Fig. 2
Fig. 3

ATTACHMENT FOR SHOPPING CART

BACKGROUND OF THE INVENTION

This invention relates to a shopping cart attachment and is more particularly concerned with an attachment for use on a shopping cart which will present a desk writing area for the shopper and provide means for identifying the location of items included in the shopping area.

Most all of our supermarkets today include shopping carts which the shopper can obtain and maneuver over the shopping area for containing goods to be purchased. As the shopper locates these items they are placed in the cart, with the cart then maneuvered to a checkout area. One of the problems in utilizing a shopping cart is that the shopper will usually have a list of items to be purchased and it is often desirable to mark these items off as they are located. In the past, it has been difficult to make these items off the list since the shopper must hold the list in one hand and the writing instrument in another hand and the hand used for supporting the shopping list does not provide a smooth or flat surface on which the items can be checked. Further, in the use of a shopping list and shopping cart, it is unhandy to hold the shopping list and writing instrument while the shopper retrieves and places the items to be purchased in the cart, since the present shopping carts do not provide a place for holding the shopping list during use.

Another problem with using a shopping cart and attempting to locate items in a shopping area, is determining the location of the items desired for purchase. Many of the supermarkets include a sign located above a particular shopping aisle, with the sign including identifying means and including a list of a few items located in that particular aisle. However, these shopper guides do not include many of the items located in the shopping area. Further, it is sometimes necessary to transverse a number of aisles to read all of the signs in attempting to locate the item desired.

SUMMARY OF THE INVENTION

The above disadvantages mentioned in the use of a shopping cart have been overcome by the present invention which basically includes an attachment which can be pivotally connected to the shopping cart and movable between a non use position supported in vertical orientation on the outside of the rear wall and can be displaced to a horizontally oriented operable position.

One feature of the present invention is that when the attachment is moved to the horizontally oriented operable position, the attachment presents a smooth upper surface and includes means for releasably holding a shopping list.

A further feature of the present invention is the inclusion of an itemized list and location of products available in the supermarket.

It is therefore a primary object of the present invention to provide an attachment for use on a shopping cart which will include means for supporting and providing a writing surface for a shopping list and will include means for identifying the location of products to be selected.

A further object of the present invention is to provide an attachment for a shopping cart which can be readily moved between a non use position and a useable position without interferring with any other use of the shopping cart.

A still further object of the present invention is to provide an attachment for use on a shopping cart which will permit display of advertising media.

Still another object of the present invention is to provide an attachment for use on a shopping cart having means for holding and maintaining a writing instrument in a retrievable position.

An additional object of the present invention is to provide an attachment for use on a shopping cart which is simple in construction and use, economical to manufacture and reliable in performance.

These and other objects and advantages of the details of construction will become apparent after reading the following description of the illustrative embodiment, with reference to the attached drawings wherein like reference numerals have been used to refer to like parts throughout the several figures, and wherein:

BRIEF DESCRIPTION OF THE DRAWINGS

FIG. 1 is a fragmentary perspective view of a shopping cart showing the attachment embodying the principles of the present invention supported in an operable position;

FIG. 2 is a vertical sectional view taken longitudinally through the shopping cart showing the attachment supported in a non use position; and FIG. 3 is a fragmentary side elevational view of a shopping cart with the rear wall panel of the shopping cart adjusted to a horizontally oriented position for nesting additional shopping carts, with the additional shopping carts being shown in phantom lines.

DESCRIPTION OF THE ILLUSTRATIVE EMBODIMENT

Referring now to the drawing, the attachment embodying the principles of the present invention is shown on a shopping cart generally represented by the reference numeral 5, with the attachment being generally represented by the reference numeral 40. The shopping cart is of conventional wire rod construction and includes side wall means 6, 7, handle guide means 8 and a rear wall 9. The rear wall 9 includes a horizontally oriented top rod member 10 which is pivotally supported at its opposite ends in the handle guide member 8. The rear wall 9 includes a number of vertically oriented rod elements 11 operatively connected between the top rod member 10 and a bottom horizontally extending rod member 12.

As shown in FIG. 1, the shopping cart include an adjustable inner wall 13. The adjustable inner wall 13 includes a pair of inverted U shaped rod elements 14, having upper base portions 14a and depending legs 14b with the lower extended end of the legs 14b being formed around rod member 12 to define a pivotally connection therebetween. The adjustable inner wall 13 also includes a number of vertical oriented rod members 15 which extend from base portion 14b to a horizontally extending rod member 16. The shopping cart also includes an infant seat portion generally represented by the reference numeral 20. The infant seat portion 20 is constructed of a number of fore and aft extending rod members with certain of the rod members including end portion 21 formed around the transverse rod member 16 to provide a pivotal connection therebetween. The infants seat portion 20 also includes a transverse rod portion 22 which is slidably received within a number of guide slots 23 formed on the rear wall vertically extending rod members 11. Inner wall 13 is movable between adjusted positions wherein the wall is supported in contact with the rear wall 9 and is movable to an angular displaced forward position, as shown in FIG. 1. When the inner wall 13 is moved to the forwardly displaced position, the infant seat means 20 is adjusted relative to the guide slot means 23 to define a seating area on which an infant can be positioned during use of the shopping cart. The rear wall means 9 is also provided with conventional openings through which as infants legs or feet can be positioned during use of the infant seat means.

As shown in FIG. 1-3, the rear wall means 9 is pivotally adjustable from a vertically oriented position as shown in FIGS. 1 and 2 to a horizontally oriented position, as shown in FIG. 3, whereby adjacent carts can be nested relative to each other when not in use. The pivotal support of transverse rod member 10 will permit the rear wall to be adjusted between the vertically and horizontally oriented positions described above. The above described shopping cart is of conventional construction and forms no part of the present invention. The details of the cart were described so that an understanding can be obtained of the attachment embodying the principles of the present invention.

As shown in FIGS. 1-3, the attachment embodying the principles of the present invention is generally represented by the reference numeral 40. Attachment 40 is constructed of an integral piece of synthetic material and includes a substantially flat upper surface 41. The flat upper surface 41 defines a desk area on which a shopper's list 42 can be placed. The shopper's list 42 is releasably secured on the upper surface 41 by means of a biasing clamp means 43. The biasing clamp means 43 is integrally formed with the attachment means and is provided with a slotted area 43a in which the shoppers list is releasably gripped. The shopper's list clamping means 43 also define a shoulder portion behind which a writing instrument, such as a pencil or pen, can be placed during use of the shopping cart and attachment.

The upper surface of the attachment is divided into a number of outlined areas 45, 46 and 47. The outline areas 45, 47 will provide an area on which advertising media can be displayed. Outlined area 46 will provide an area on which an itemized list and location of products included in the super markets can be displayed. The itemized shoppers list would include the items listed alphabetically with the location of the aisle on which the product is displayed aligned with the product so that the shopper can readily refer to the itemized list and determine the aisle on which the product is located.

As shown in FIGS. 1-3, the attachment member 40 is provided with a number of integrally formed projecting portions 50. The integrally formed projecting portions 50 are provided with transversely extending axially aligned openings 51 and a radially extending slot 52. Projections 50 are detailed for pivotally engaging the base portions 14b of the adjustable inner wall 13. In the placement of the attachment on the shopping cart, the rod base portion 14b is located adjacent radially extending slots 52 and the rod portion is forced through the slots into the open area 51. Slots 52 are detailed in dimension to be slightly less than the diameter of the rod base portion 14b so that the rod will not be inadvertently disposed from the attachment member. Projections 5b being constructed of synthetic material will permit the slot 52 to be expanded during displacement of the rod through the slot and will allow the projections to be returned to their normal position so that the attachment member can be pivotally supported by the inner wall portion 13.

When the inner wall 13 is supported in the collapsed non use position in contact with rear wall 9, the attachment member 40 will be supported in a generally vertically oriented position adjacent the outer surface of rear wall 9. When inner wall 13 is angularly displaced forward to the infant seat forming position, attachment member 40 will be moved forward and horizontally oriented as shown in FIG. 1. When the attachment member 40 is supported in the horizontally oriented operable position, the bottom surface of the rear end of the attachment member will be in abutting engagement with the upper surface of rod member 10. As shown in FIGS. 1-2, the underside of the attachment member 40 is provided with a number of downwardly extending integrally formed projections 55 which define a forwardly open notched area 56. When the attachment means is moved to the horizontally oriented operable position, the bottom surface of the attachment member will slide over rod 10 until the rod 10 is engaged and positioned in notch 56. Projection 55 with notch 56 will permit the rear extended end of the attachment member from being angular displaced when moved to the horizontally oriented operable position. After the shopping cart has been used, the inner wall 13 can again be returned to the displaced vertically oriented position and during the adjustment of the rear wall 13 the attachment means will move rearwardly so that transverse rod 10 will be displaced outwardly of notches 56 and will allow the attachment member to again drop or be rotated by gravity to the vertically oriented position located on the outside of rear wall 9.

The above described attachment member will permit full use of the shopping cart and will permit shopping cart to be nested with adjacent shopping cart when not in use.

It is obvious that the attachment member 40 can be constructed of various materials, such as rod wire means and that the attachment member could be provided with a number of auxiliary features, one such feature could include a recessed area which would define an ash tray or another feature could be opening in which beverage bottles could be located or supported during use of the shopping cart.

It now becomes apparent that the above described illustrative embodiment of an attachment for use on shopping cart is capable of obtaining the above stated objects and advantages. It is obvious that those skilled in the art may make modifications in the details of construction without departing from the spirit of the invention which is to be limited only by the scope of the appended claims.

What is claimed is:

1. In a shopping cart of the type including an open top basket with a rear wall pivotably supported at its upper portion about a horizontal axis so that its lower portion is swingable inwardly into the basket and an inner wall pivotally supported at its lower end to said rear wall with its upper portion swingable toward and away from the upper portion of said rear wall between positions adjacent said rear wall and spaced away from said rear wall, the combination therewith of an attachment connected at one of its end portions to the upper portion of said inner wall and of a length sufficient to extend over the upper portion of said rear wall when said inner wall is spaced away from said rear wall, said attachment being pivotable with respect to the inner wall so that it rests upon and is supported by the upper portion of said rear wall when said inner wall is spaced away from said rear wall and is slidable over the upper portion of said rear walls as said inner wall is moved toward or away from said rear wall and hangs in a downward attitude from said inner wall when said inner wall is adjacent said rear wall said attachment comprises a platform with a substantially flat surface facing upwardly when said inner wall is spaced away from said rear wall and said attachment rests upon the upper portion of said rear wall.

* * * * *